No. 799,538. PATENTED SEPT. 12, 1905.
J. B. CONOVER.
CAN.
APPLICATION FILED MAR. 1, 1904.
2 SHEETS—SHEET 1.
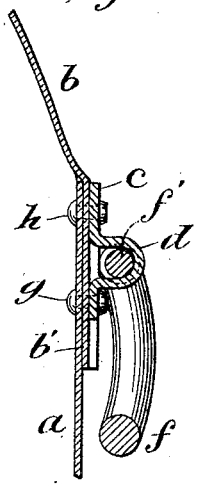
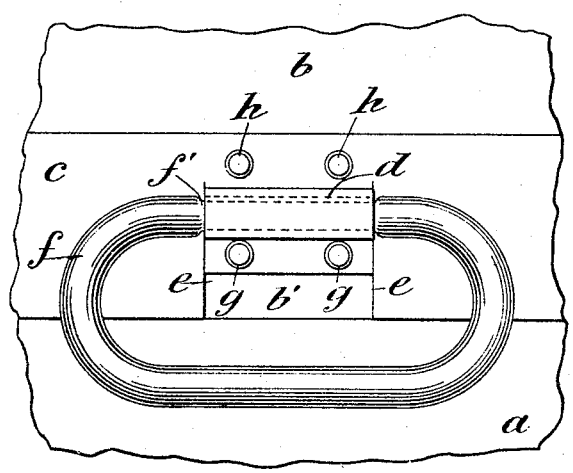
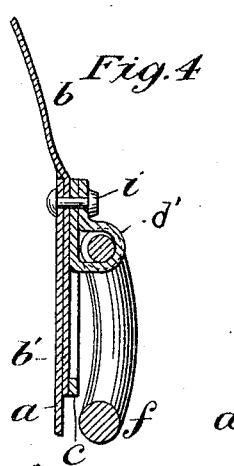
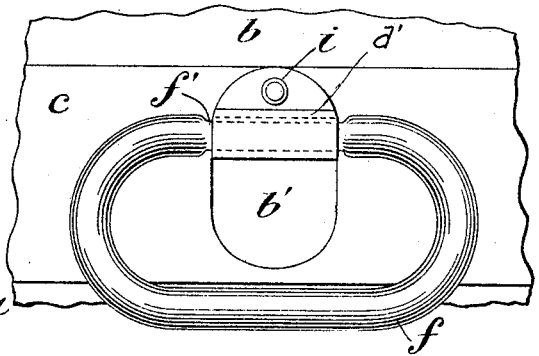
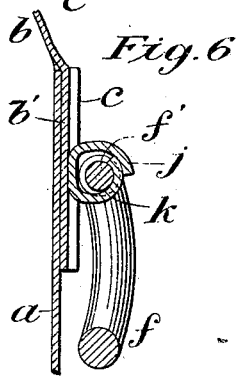
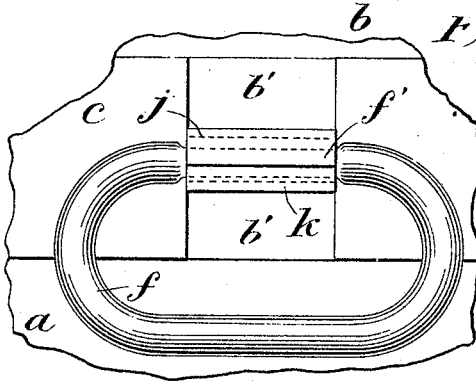
Witnesses:
Henry Barnes
Martha Ploger
Inventor:
Jacob B. Conover
by Henry L. Williams
Atty.

No. 799,538. PATENTED SEPT. 12, 1905.
J. B. CONOVER.
CAN.
APPLICATION FILED MAR. 1, 1904.
2 SHEETS—SHEET 2.
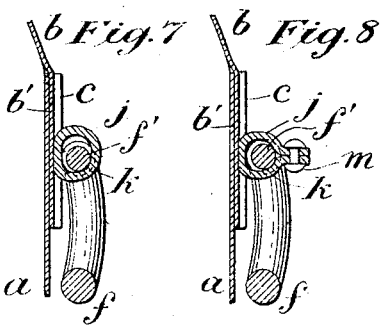
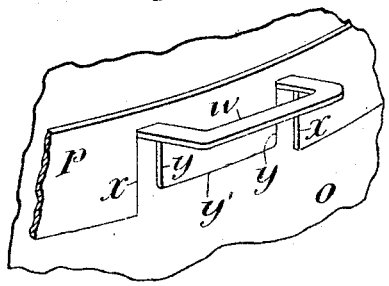
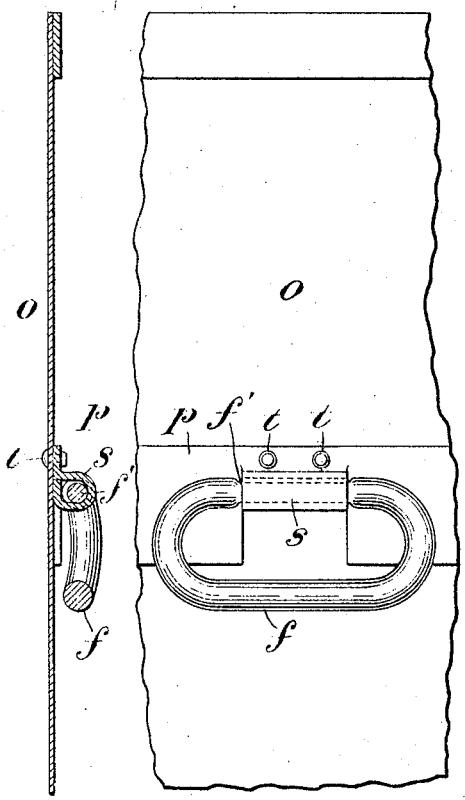
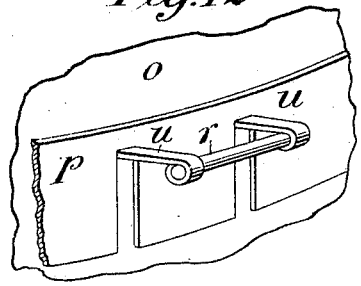
Witnesses:
Henry Barnes
Martha Roger
Inventor:
Jacob B. Conover
by Henry D. Williams
Atty.

UNITED STATES PATENT OFFICE.

JACOB B. CONOVER, OF JERSEY CITY, NEW JERSEY.

CAN.

No. 799,538.   Specification of Letters Patent.   Patented Sept. 12, 1905.

Application filed March 1, 1904. Serial No. 196,040.

*To all whom it may concern:*

Be it known that I, JACOB B. CONOVER, a citizen of the United States, residing at Jersey City, in the county of Hudson and State of New Jersey, have invented certain new and useful Improvements in Cans, of which the following is a specification, reference being had therein to the accompanying drawings, forming a part thereof.

This invention relates to cans, such as milk-cans and ash-cans, and more specifically to milk-cans and to the projecting supporting parts thereof. Where the handles are pivoted, such projecting supporting parts are the ears of the handles. It is particularly desirable in the manufacture of such cans that as many as possible of the several operations shall be performed by machinery and that the hand-work required shall be as little as possible. The supporting parts or handle-ears of the cans have heretofore been made of separate pieces attached by rivets and by soldering to the outer surfaces of the cans, and this attachment has been effected principally and almost entirely by hand-work, and the supporting parts or handle-ears have required the most careful soldering by hand, involving considerable time, labor, and expense. Moreover, the supporting parts or handle-ears by reason of the fact that they are projecting parts have been peculiarly subject to strains and concussions in the rough usage to which cans are frequently subjected.

One of the objects of my invention is to greatly reduce the amount of hand labor required in the formation of the supporting parts or handle-ears and also to reduce the number of parts and to secure a more rigid attachment of the supporting parts or handle-ears by the utilization of the material of an outer part at a reinforced portion of the can in the formation of the supporting parts or handle-ears.

My invention also has for its object the formation of such supporting parts or handle-ears from such outer parts by simple cutting and bending operations, whereby the material of the outer parts is partly cut out to provide material for the supporting parts or handle-ears, and such partly-cut-out integral portions of the outer parts are bent and shaped to form the supporting parts or handle-ears; and my invention has for its objects economy in manufacture and simplicity of construction, strength, and durability.

I will now describe the constructions illustrated in the accompanying drawings and embodying my invention and will thereafter point out my invention in claims.

Figure 1 is a face view of a handle, handle-ear, and adjacent portions of a milk-can. Fig. 2 is a vertical section of the same. Figs. 3 and 4 are similar views of a modified construction, and Figs. 5 and 6 are similar views of another modified construction. Figs. 7 and 8 are vertical sections of other modified constructions. Fig. 9 is a face view of a handle, handle-ear, and adjacent portions of an ash-can. Fig. 10 is a vertical section of the same. Figs. 11 and 12 are perspective views of different modified constructions.

In Figs. 1 to 8, inclusive, portions of a milk-can are shown comprising the upper part of the cylinder or body $a$, the lower part of the breast $b$, including the breast-flange $b'$, overlapping the body and making the body part of the can at such overlapping portion of double thickness and the reinforcing-hoop $c$ at such overlapping portion adding another thickness of metal at such overlapping portion. In the construction shown in Figs. 1 and 2 the partly-cut-out portion, which is cut from the hoop to form a supporting part or handle-ear, is cut in the shape of a rectangular tongue $d$, extending from a point somewhat above the medial longitudinal line of the hoop to the lower edge thereof. Two vertical cuts $e$, extending from the bottom of the hoop up to the line of the root of the tongue, produce this tongue, and the tongue thus produced is bent outward and downward around the bar $f'$ of the pivoted handle $f$ and then inward toward the can and then downward against the adjacent outer part of the can, which in this construction is the outer face of the breast-flange $b'$, and is suitably secured to the can, as by the two rivets $g$, penetrating the lower end of the tongue $d$, the breast-flange $b'$, and the body $a$. The hoop is also additionally secured to the body part of the can by two rivets $h$ above the tongue. In the construction shown in Figs. 3 and 4 the partly-cut-out portion of the hoop is a tongue $d'$ with a rounded contour at its lower edge, and the tongue does not extend to the bottom of the hoop. The tongue $d'$ is bent outward and upward around the handle-bar $f'$ and inward toward the can and then upward against the adjacent outer part of the can, which in this construction is the outer face of the hoop c, and is suitably secured to the can, as by the rivet h, penetrating the upper end of the tongue d', the hoop c, the breast-flange b', and the body a. In the constructions shown in Figs. 5, 6, 7, and 8 the partly-cut-out portion of the hoop comprises two tongues j and k, the tongue j extending from a point somewhat above the medial longitudinal line of the hoop to the top of the hoop and the tongue k extending from a point somewhat below the medial longitudinal line of the hoop to the bottom of the hoop. These tongues are bent outward and each partly around the handle-bar f'', and in the construction shown in Figs. 5 and 6 the ends of the tongues overlap and may be united by solder. In the construction shown in Fig. 7 the ends of the tongues are abutted and welded, and in the construction shown in Fig. 8 the ends of the tongues are bent outward to form flanges united by a rivet m.

In Figs. 9 to 14, inclusive, portions of an ash-can are shown comprising the body o and an outer reinforcing-hoop p in Figs. 9 to 12, inclusive, and an inner reinforcing-plate q in Figs. 13 and 14. A pivoted handle f is shown in Figs. 9 and 10, and the ear of this pivoted handle is formed by a tongue s, cut out from the hoop p in the same manner as in the construction shown in Figs. 1 and 2 and bent outward and downward around the bar f'' of the handle and inward, as in such construction, but bent upward in contact with the body o of the can and so that the end is concealed by the outer part of the ear. This upwardly-extending end of the tongue may be readily secured to the body o by solder, and above the tongue the rivets t t form an additional securing device for the hoop. In the construction shown in Fig. 11 the supporting part is completely formed by the cut-out portion of the hoop, a U-shaped tongue w being formed by two vertical cuts x, extending downward from points somewhat below the top of the hoop p and extending down to the bottom of the hoop, and by parallel cuts y, extending from below the top of the hoop and terminating above the bottom of the hoop and joined by a horizontal cut y'. This tongue is merely bent straight out to form the handle or supporting part. In the construction shown in Fig. 12 there are two vertical tongues u u, cut from the hoop p and bent out and at their outer ends bent around the ends of a bar r, which bridges across the two tongues and completes the handle.

It is obvious that various other modifications may be made in the constructions shown and above particularly described within the spirit and scope of my invention.

What I claim, and desire to secure by Letters Patent, is—

1. A can having a body part and a hoop, the hoop being partly cut away to provide a partly-cut-out portion for a projecting supporting part and such supporting part being formed of the partly-cut-out portion of the hoop.

2. A can having a body part and a hoop, the hoop being partly cut away to provide a partly-cut-out portion for a handle-ear and such handle-ear being formed of the partly-cut-out portion of the hoop.

3. A can having a body part and a hoop and a pivoted handle, the hoop being partly cut away to provide a tongue for an ear for such handle and such handle-ear being formed of the tongue of the hoop and extending over the bar of the handle.

4. A can having a body part and a hoop and a pivoted handle, the hoop being partly cut away to provide a partly-cut-out portion for an ear for such handle and such handle-ear being formed of the partly-cut-out portion of the hoop and projecting outward and around the bar of the handle and then inward and into contact with the outer surface of the can and secured at such place of contact.

5. A milk-can having a body, a breast-flange overlapping the body and a hoop over the overlapping breast-flange, the hoop being partly cut away to provide a partly-cut-out portion for a supporting part, and the supporting part being formed of such partly-cut-out portion of the hoop.

6. A milk-can having a body, a breast-flange overlapping the body and a hoop over the overlapping breast-flange, the hoop being partly cut away to provide a partly-cut-out portion for a handle-ear and such handle-ear being formed of the partly-cut-out portion of the outer part.

7. A milk-can having a body, a breast-flange overlapping the body, a hoop over the overlapping breast-flange, and a pivoted handle, the hoop being partly cut away to provide a partly-cut-out portion for an ear for such handle and such handle-ear being formed of the partly-cut-out portion of the hoop and extending over the bar of the handle.

8. A milk-can having a body, a breast-flange overlapping the body, a hoop over the overlapping breast-flange, and a pivoted handle, the hoop being partly cut away to form a tongue and the ear for the handle being formed of such tongue and projecting outward and around the bar of the handle and inward and into contact with the outer surface of the can and secured at such place of contact, substantially as set forth.

In testimony whereof I have affixed my signature n presence of two witnesses.

JACOB B. CONOVER.

Witnesses:
HENRY D. WILLIAMS,
HERBERT H. GIBBS.